(12) United States Patent
Hanioka et al.

(10) Patent No.: US 10,211,698 B2
(45) Date of Patent: Feb. 19, 2019

(54) INVERTER INTEGRATED MOTOR APPARATUS

(71) Applicant: MITSUBISHI ELECTRIC CORPORATION, Chiyoda-ku (JP)

(72) Inventors: Shota Hanioka, Chiyoda-ku (JP); Yoshihiro Miyama, Chiyoda-ku (JP); Norihiro Watanabe, Chiyoda-ku (JP); Akihiro Daikoku, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 199 days.

(21) Appl. No.: 15/125,243

(22) PCT Filed: Mar. 19, 2015

(86) PCT No.: PCT/JP2015/058258
§ 371 (c)(1),
(2) Date: Sep. 12, 2016

(87) PCT Pub. No.: WO2015/178087
PCT Pub. Date: Nov. 26, 2015

(65) Prior Publication Data
US 2017/0077779 A1 Mar. 16, 2017

(30) Foreign Application Priority Data
May 20, 2014 (JP) ................. 2014-104320

(51) Int. Cl.
*H02K 9/00* (2006.01)
*H02K 5/22* (2006.01)
(Continued)

(52) U.S. Cl.
CPC ................ *H02K 5/22* (2013.01); *H02K 5/18* (2013.01); *H02K 9/22* (2013.01); *H02K 11/33* (2016.01); *H02K 3/522* (2013.01)

(58) Field of Classification Search
CPC . H02K 5/22; H02K 11/33; H02K 5/18; H02K 9/22; H02K 3/522
(Continued)

(56) References Cited

U.S. PATENT DOCUMENTS 5,932,942 A * 8/1999 Patyk .................. H02K 11/33
310/58
2004/0090130 A1 5/2004 Kaneko et al.
(Continued)

FOREIGN PATENT DOCUMENTS

JP 2001-135962 A 5/2001
JP 2004-159454 A 6/2004
(Continued)

OTHER PUBLICATIONS

International Search Report dated Jun. 16, 2015 in PCT/JP2015/058258 filed Mar. 19, 2015.

*Primary Examiner* — Jianchun Qin
(74) *Attorney, Agent, or Firm* — Oblon, McClelland, Maier & Neustadt, L.L.P.

(57) ABSTRACT

In an inverter integrated motor apparatus, a cylindrical base frame has an inverter unit accommodating section. The inverter unit has a plurality of control substrates and a plurality of power modules which are provided on the control substrates. In the inverter unit accommodating section, a plurality of openings are provided at intervals in the circumferential direction. A rib section is formed between mutually adjacent openings. The openings are covered by the plurality of heat sinks. The power modules and control substrates are disposed on the inside of the heat sinks.

12 Claims, 13 Drawing Sheets

(51) Int. Cl.
  *H02K 9/22* (2006.01)
  *H02K 11/33* (2016.01)
  *H02K 5/18* (2006.01)
  *H02K 3/52* (2006.01)

(58) Field of Classification Search
  USPC .......................................................... 310/54
  See application file for complete search history.

(56) References Cited

U.S. PATENT DOCUMENTS

| | | |
|---|---|---|
| 2010/0327679 A1 | 12/2010 | Fujita et al. |
| 2013/0278090 A1* | 10/2013 | Matsuo .................... H02K 5/20 |
| | | 310/54 |

FOREIGN PATENT DOCUMENTS

| | | |
|---|---|---|
| JP | 2004-236470 A | 8/2004 |
| JP | 2008-125221 A | 5/2008 |
| JP | 2009-162091 A | 7/2009 |
| JP | 2011-30408 A | 2/2011 |
| JP | 2012-74440 A | 4/2012 |
| WO | 2015/093138 A1 | 6/2015 |

\* cited by examiner

INVERTER INTEGRATED MOTOR APPARATUS

TECHNICAL FIELD

This invention relates to an inverter integrated motor apparatus in which a motor unit and an inverter unit are accommodated within the same base frame.

BACKGROUND ART

In a conventional power amplifier, a plurality of heat sinks are installed on the outer circumferential surface of a center sleeve. Furthermore, a plurality of substrates are accommodated inside the center sleeve. A power transistor is installed on a base section of a heat sink. The terminals of the power transistor are connected to the substrate (see, for example, PTL 1).

Furthermore, in a conventional cooling structure of an electric-powered turbocharger for an engine, the circuit components of the inverter are divided respectively in accordance with the respective phases of u, v, w, and are accommodated in individual substrates for each phase. Furthermore, the substrates are installed on the inner circumference of a cylinder having three or more surfaces having good thermal conductivity (heat sinks) (see, for example, PTL 2).

CITATION LIST

Patent Literature

[PTL 1]
Japanese Patent Application Laid-Open No. 2001-135962
[PTL 2]
Japanese Patent Application Laid-Open No. 2009-162091

SUMMARY OF INVENTION

Technical Problem

When it is sought to apply the structure of the power amplifier indicated in PTL 1 to an inverter integrated motor apparatus, the heat generated by the motor is transmitted to the inverter and the cooling performance of the power module declines.

Furthermore, if it is sought to apply the cooling structure disclosed in PTL 2 to an inverter integrated motor apparatus, when the inverter apparatus is installed on an inner circumferential surface of a cylindrical frame, it is necessary to carry out a screw fastening operation perpendicularly with respect to the inner circumferential surface of the frame, from the inner side of the frame, and since the work space is narrow, the assembly work is difficult.

This invention was devised in order to resolve the problem described above, an object thereof being to obtain an inverter integrated motor apparatus which is capable of simultaneously achieving improvement in the assembly characteristics of the inverter unit and improvement of the cooling performance of the inverter unit.

Solution to Problem

The inverter integrated motor apparatus according to this invention includes: a cylindrical base frame which has a motor unit accommodating section and an inverter unit accommodating section; a motor unit which is accommodated in the motor unit accommodating section; an inverter unit which has a plurality of control substrates and a plurality of power modules which are provided on the control substrates, the inverter unit being accommodated in an inverter unit accommodating section; and a plurality of heat sinks which cool the power modules, wherein in the inverter unit accommodating section a plurality of openings are provided at intervals in a circumferential direction; a rib section is formed between mutually adjacent openings; the heat sinks are installed on the base frame so as to cover the openings; and the power modules and control substrates are disposed on the inside of the heat sinks.

Advantageous Effects of Invention

In the inverter integrated motor apparatus of this invention, in the inverter unit accommodating section a plurality of openings are provided at intervals in the circumferential direction, a rib section is formed between the mutually adjacent openings, heat sinks are installed on the base frame so as to cover the openings, and power modules and control substrates are disposed on the inside of the heat sinks, and therefore it is possible to simultaneously achieve both improvement in the assembly properties of the inverter unit and improvement in the cooling performance of the inverter unit.

DESCRIPTION OF EMBODIMENTS

Below, embodiments of this invention are described with reference to the drawings.

First Embodiment

Figure 1:
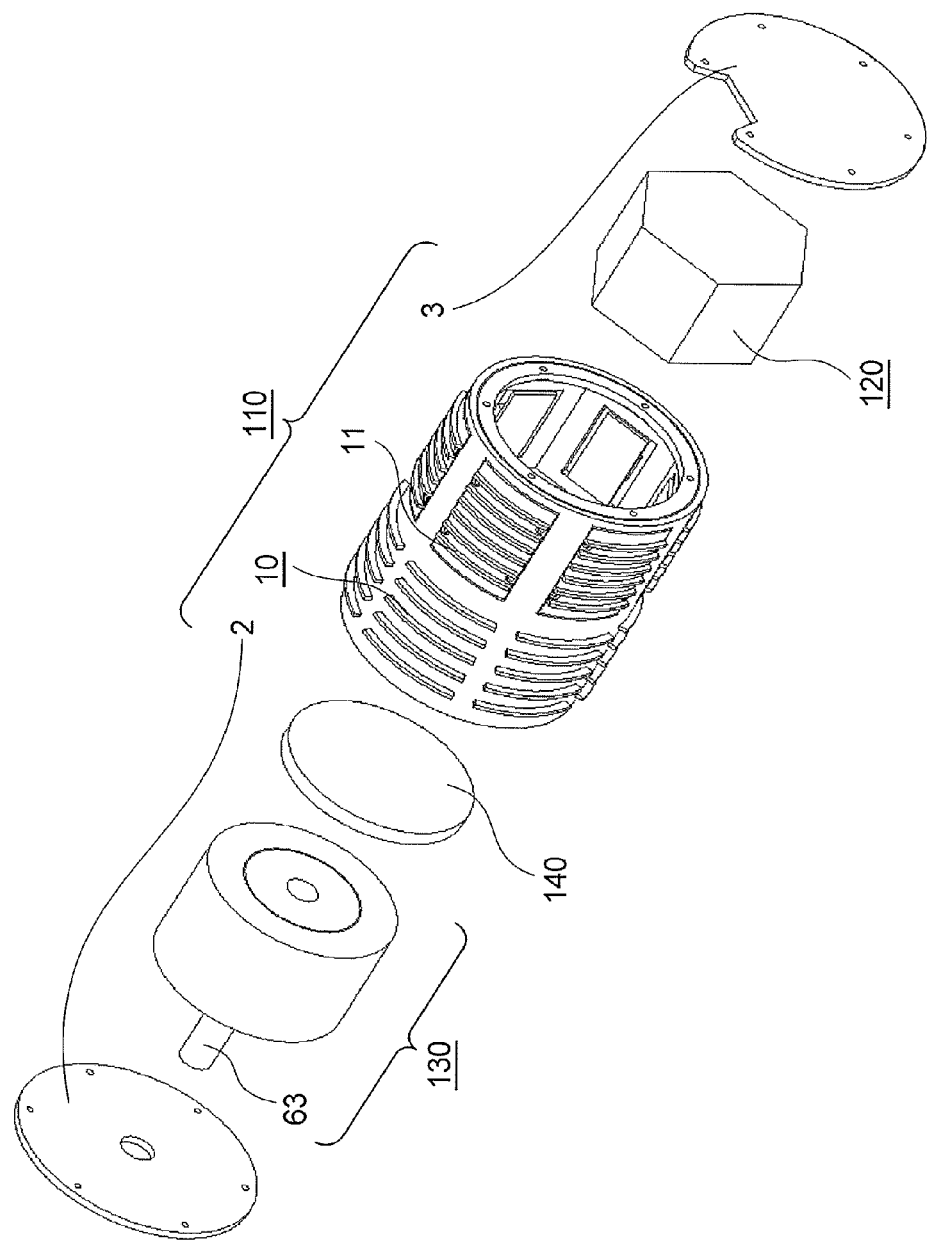
FIG. 1 is an exploded perspective drawing showing an inverter integrated motor apparatus according to a first embodiment of this invention.

FIG. 1 is an exploded perspective diagram showing an inverter integrated motor apparatus according to a first embodiment of this invention, and the inverter integrated motor apparatus according to the first embodiment combines a duel three-phase motor and an inverter device which drives this motor.

In FIG. 1, the inverter integrated motor apparatus has a frame unit 110, an inverter unit 120 and motor unit 130 which are accommodated inside the frame unit 110, and a circular disk-shaped wire connection plate unit 140 which is disposed between the inverter unit 120 and the motor unit 130 inside the frame unit 110.

The frame unit 110 includes a cylindrical base frame 10, a plurality of heat sinks 11 (here, six heat sinks 11) which are installed at intervals in the circumferential direction on the outer circumferential surface of the base frame 10, an end plate 2 which is a load-side cover, and a front plate 3 which is an opposite load-side cover.

The inverter unit 120 is disposed on the opposite load-side of an output shaft 63 of the motor unit 130. Furthermore, the inverter unit 120 converts DC power supplied from an external DC power source, to AC power, and supplies this power to the motor unit 130. The wire connection plate unit 140 is fitted inside the frame unit 110 so as to form no gap with respect to the inner circumferential surface of the frame unit 110.

Figure 2:
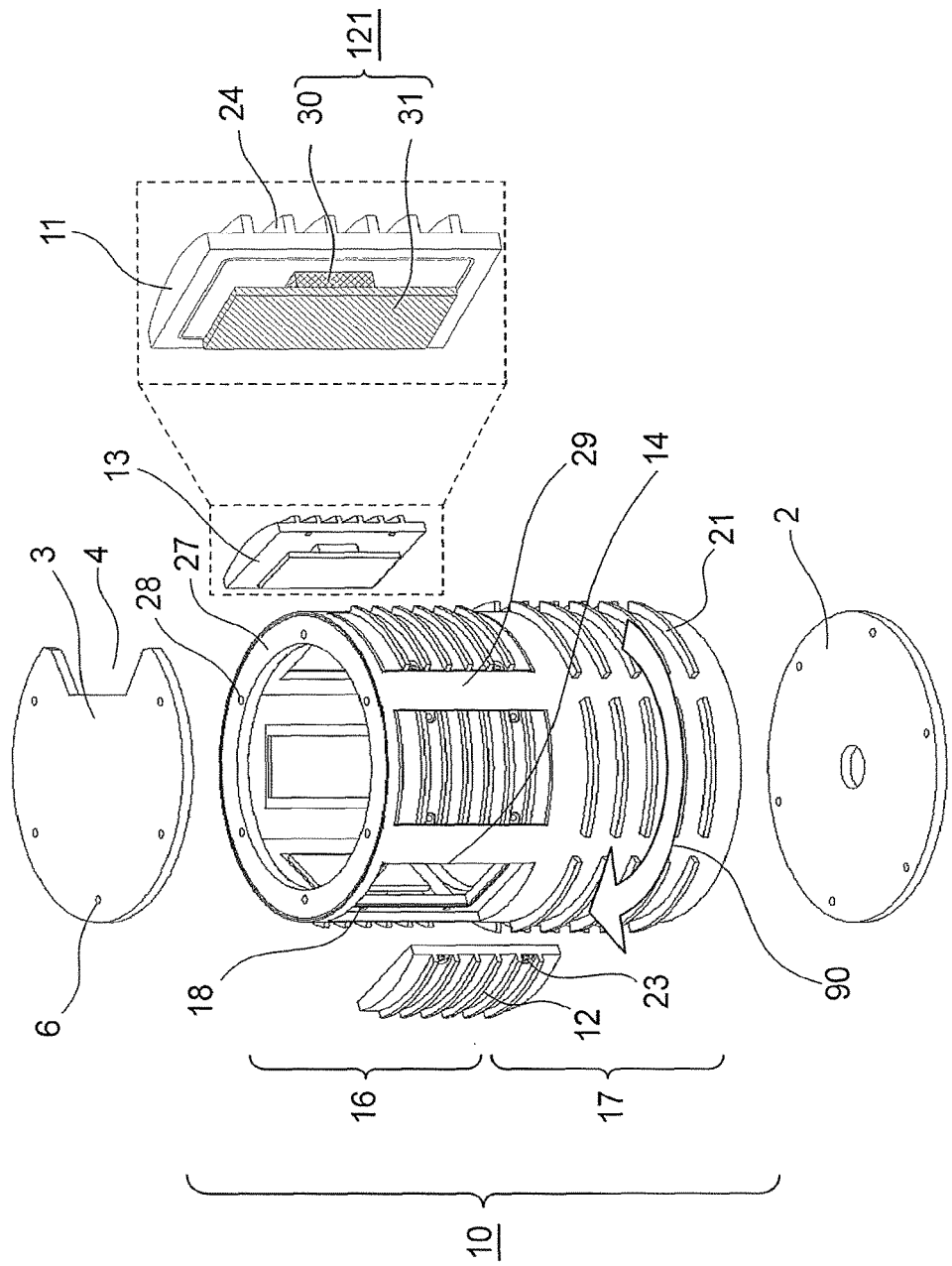
FIG. 2 is an exploded perspective drawing showing the frame unit in FIG. 1, as viewed with an opposite load-side upwards.
Figure 3:
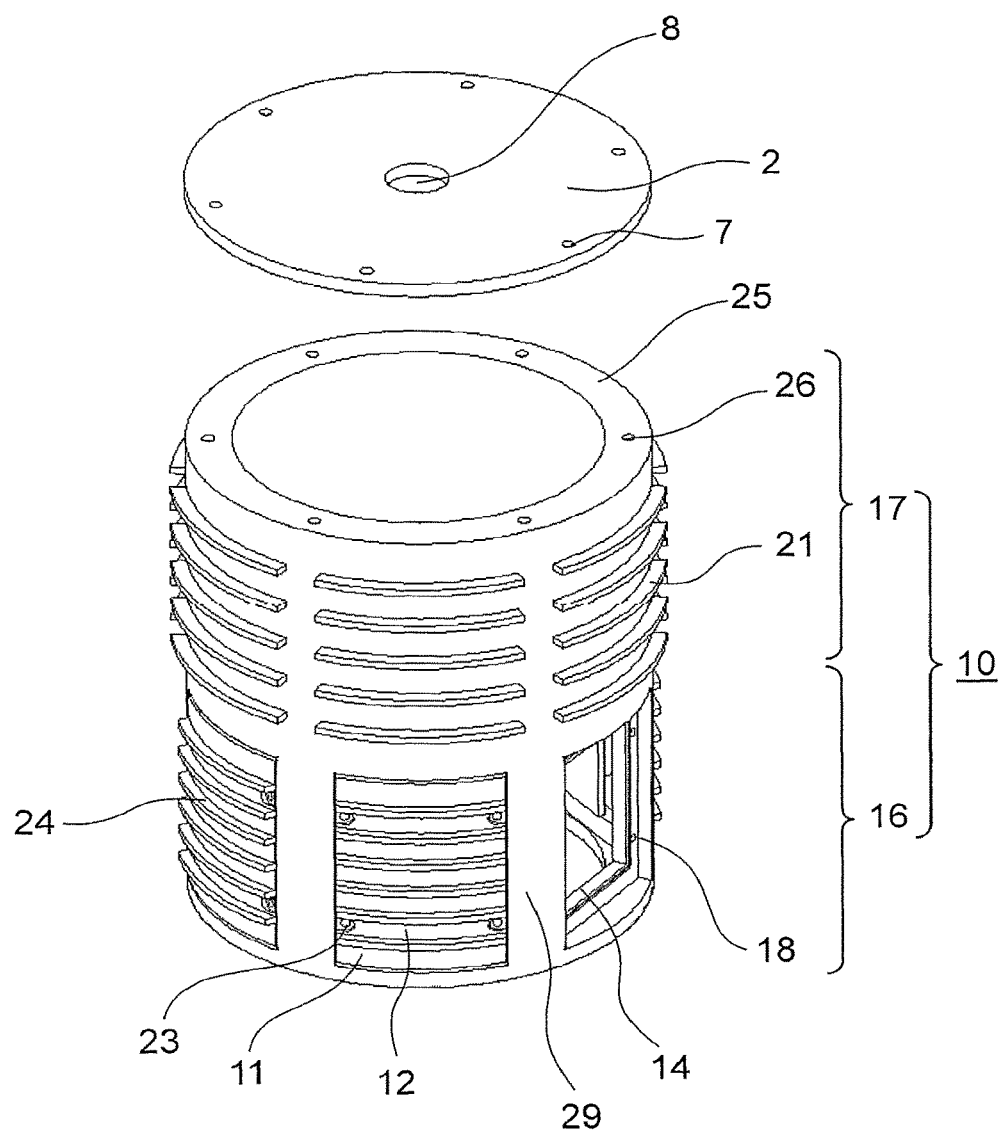
FIG. 3 is an exploded perspective drawing showing the frame unit in FIG. 1, as viewed with a load-side upwards.

FIG. 2 is an exploded perspective diagram showing the frame unit 110 in FIG. 1, viewed with the opposite load-side upwards, and FIG. 3 is an exploded perspective diagram showing the frame unit 110 in FIG. 1, viewed with the load-side upwards. The base frame 10 has a motor unit accommodating section 17 in which the motor unit 130 is accommodated, and an inverter unit accommodating section 16 in which the inverter unit 120 is accommodated. The space inside the frame unit 110 is partitioned into the motor unit accommodating section 17 and the inverter unit accommodating section 16 by the wire connection plate unit 140.

A plurality of openings (holes) 14 are provided at even intervals in the circumferential direction, in the inverter unit accommodating section 16 of the base frame 10. The outer circumferential surface of the inverter unit accommodating section 16 is a substantially hexagonal shape, and openings 14 are provided in each of the surfaces of the hexagonal shape. The openings 14 according to the first embodiment are quadrilateral (rectangular) shaped openings of the same size.

Between the adjacent openings 14, rib sections 29 are formed in parallel with the axial direction of the base frame 10. The heat sinks 11 are installed in the base frame 10 so as to cover the openings 14. The peripheral edge sections of each opening 14 are flat. A plurality of screw holes 18 for installing the heat sink 11 are provided in the peripheral edge section of each opening 14.

The inverter unit 120 has six module units 121 which are configured by a single-phase (single-leg) power module 30 and a control substrate 31 which controls the single-phase power module 30, and a plurality of electrical components (not illustrated), such as capacitors.

The heat sinks 11 have a circular arc-shaped heat-radiating surface 12 and a power module installation surface 13 which is machined to be flat. Furthermore, the heat sinks 11 each have a plurality of heat-radiating fins 24 on the outer side in the radial direction. In other words, in the heat-radiating surface 12 a plurality of grooves are provided along the circumferential direction, by which the heat-radiating fins 24 are formed. Furthermore, a plurality of screw insertion holes 23 corresponding to the screw holes 18 are provided in each heat sink 11. The heat sinks 11 are each fastened to the base frame 10 by a plurality of screws, in such a manner that the heat-radiating surface 12 thereof faces in an outward radial direction.

Moreover, the heat sinks 11 are disposed at even intervals in the circumferential direction of the base frame 10. One power module 30 is fixed in close contact with the power module installation surface 13 of each heat sink 11, via a gel having good thermal conductivity (e.g., heat-radiating silicone gel). Therefore, the heat sinks 11 cool the power modules 30.

The control substrates 31 are installed on the heat sinks 11 together with the power modules 30. In other words, the power modules 30 and the control substrates 31 are disposed on the inside of the heat sinks 11. Heat sink assemblies which are formed in this way by installing the corresponding power modules 30 and control substrates 31 on the heat sinks 11 are fitted into the respective openings 14.

The area of the power module 30 and the control substrate 31 when the opening 14 is viewed from the center of the inverter unit accommodating section 16 is smaller than the area of the opening 14. Furthermore, in a cross-section perpendicular to the axial direction of the base frame 10, the total cross-sectional area of the rib sections 29 is smaller than the cross-sectional area of the motor unit accommodating section 17.

The cross-sectional shape of the outer circumferential surface of the motor unit accommodating section 17 is a circular shape. Furthermore, in order to radiate heat generated when driving the motor, effectively to the outside, a plurality of grooves are provided along the circumferential direction of the motor unit accommodating section 17, whereby a plurality of heat-radiating fins 21 are formed.

The heat-radiating fins 21, 24 are provided along the circumferential direction if the cooling flow channel is provided in the circumferential direction as in the cooling flow channel 90 in FIG. 2, but if the cooling flow channel lies in the axial direction, then the heat-radiating fins 21, 24 are provided in the axial direction.

A plurality of screw holes 28 are provided on the end surface 27 of the base frame 10 on the opposite load-side. Furthermore, a plurality of screw insertion holes 6 corresponding to the screw holes 28 are provided in the front plate 3. The front plate 3 is fastened to the base frame 10 by a plurality of screws.

Furthermore, a DC wire which supplies power to the power module 30 and a slot 4 through which to pass a signal wire for sending an electrical signal to the control substrate 31 are provided in the front plate 3.

The plurality of screw holes 26 are provided on the load-side end surface 25 of the base frame 10. Furthermore, a plurality of screw insertion holes 7 corresponding to the screw holes 26 are provided in the end plate 2. The end plate 2 is fastened to the base frame 10 by a plurality of screws.

Furthermore, a shaft insertion hole 8 through which to pass the output shaft 63 is provided in the end plate 2. A load-side bearing (not illustrated) is fitted to a shaft insertion hole 8.

Desirably, the frame unit 110 is made from a material having good thermal conductivity, such as aluminum, thereby raising the cooling effect. Furthermore, by using a material having particularly excellent thermal conductivity (for example, copper) for the material of the heat sinks 11, it is possible to improve the cooling performance of the power module 30.

Figure 4:
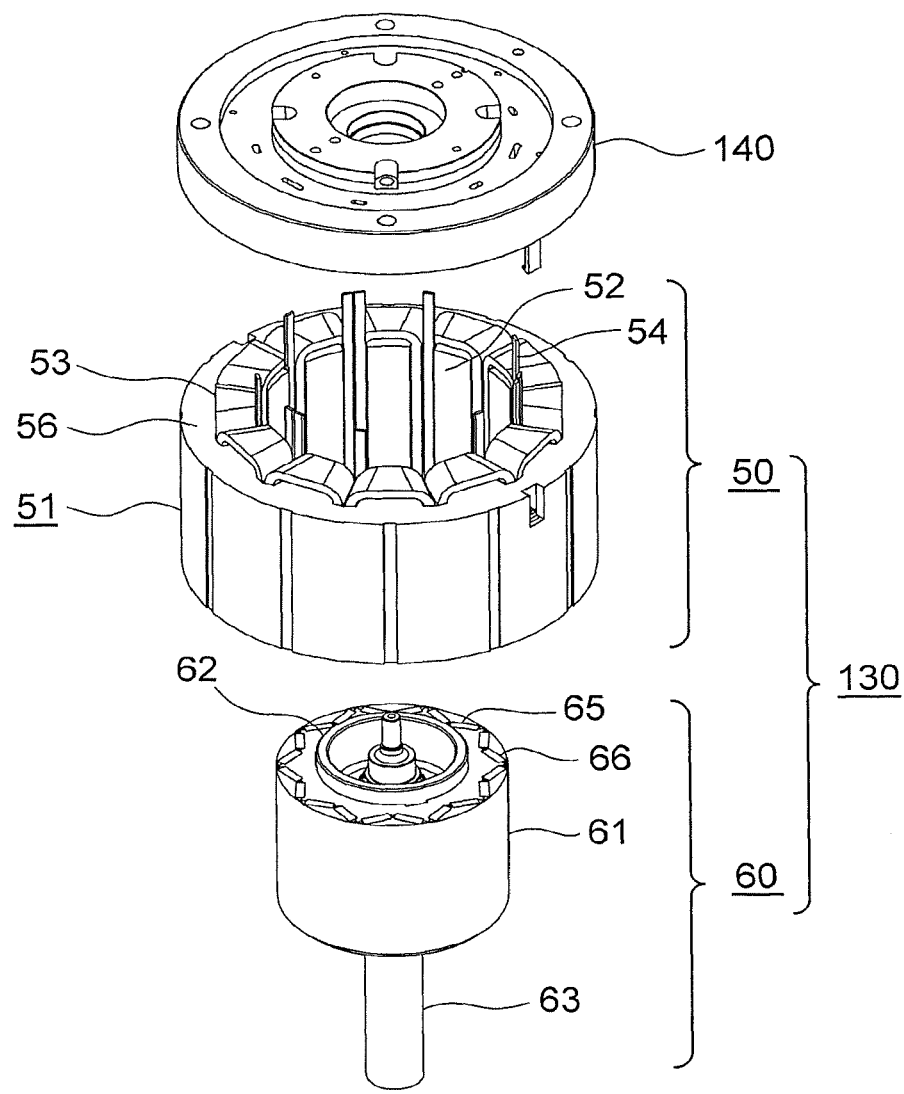
FIG. 4 is an exploded perspective diagram showing the motor unit and the wire connection plate unit in FIG. 1.

FIG. 4 is an exploded perspective diagram showing the motor unit 130 and the wire connection plate unit 140 in FIG. 1. The motor unit 130 includes a cylindrical stator unit 50 and a rotor unit 60 which is inserted inside the stator unit 50.

The stator unit 50 has a stator core 51 and a coil 53. The cross-sectional shape of the inner circumferential surface of the motor unit accommodating section 17 is circular, and the stator core 51 is fitted into and fixed inside the motor unit accommodating section 17.

The stator core 51 has a ring-shaped yoke section 56 and twelve teeth sections 52 which project in an inward radial direction from the yoke section 56. The coil 53 is installed on the teeth sections 52 from the inside of the stator core 51. Furthermore, the end portion of the coil 53 projects on the opposite load-side.

The rotor unit 60 includes a rotor core 61 and twenty permanent magnets 65. In the rotor core 61, twenty magnet insertion holes 66 are provided in the circumferential direction. The permanent magnets 65 are inserted into the magnet insertion holes 66 in such a manner that the poles thereof face in an outward radial direction alternately every two poles, N→N→S→S.

The output shaft 63 which is installed on the inner diameter of the rotor unit 60 is supported rotatably by the load-side bearing and by an opposite load-side bearing (not illustrated) which is supported by the wire connection plate unit 140.

Figure 5:
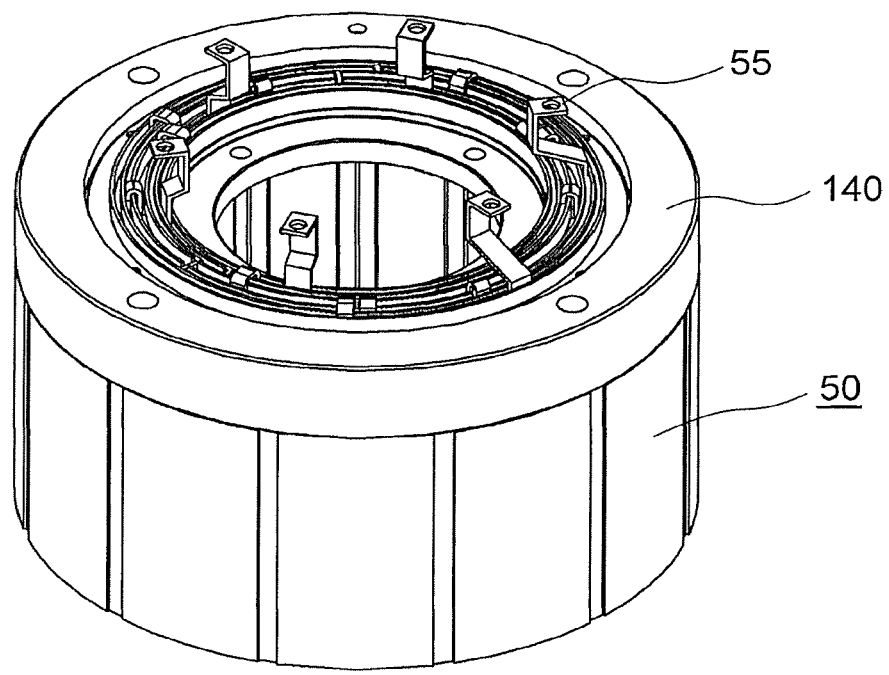
FIG. 5 is a perspective drawing showing a state where a wire connection plate unit has been installed on the stator unit in FIG. 4.

FIG. 5 is a perspective drawing showing a state where the wire connection plate unit 140 has been installed on the stator unit 50 in FIG. 4. In the wire connection plate unit 140, the ends of the coils 53 are connected respectively for each phase, and a plurality of connection terminals 55 are configured for connecting with the output terminals of the power modules 30.

Figure 6:
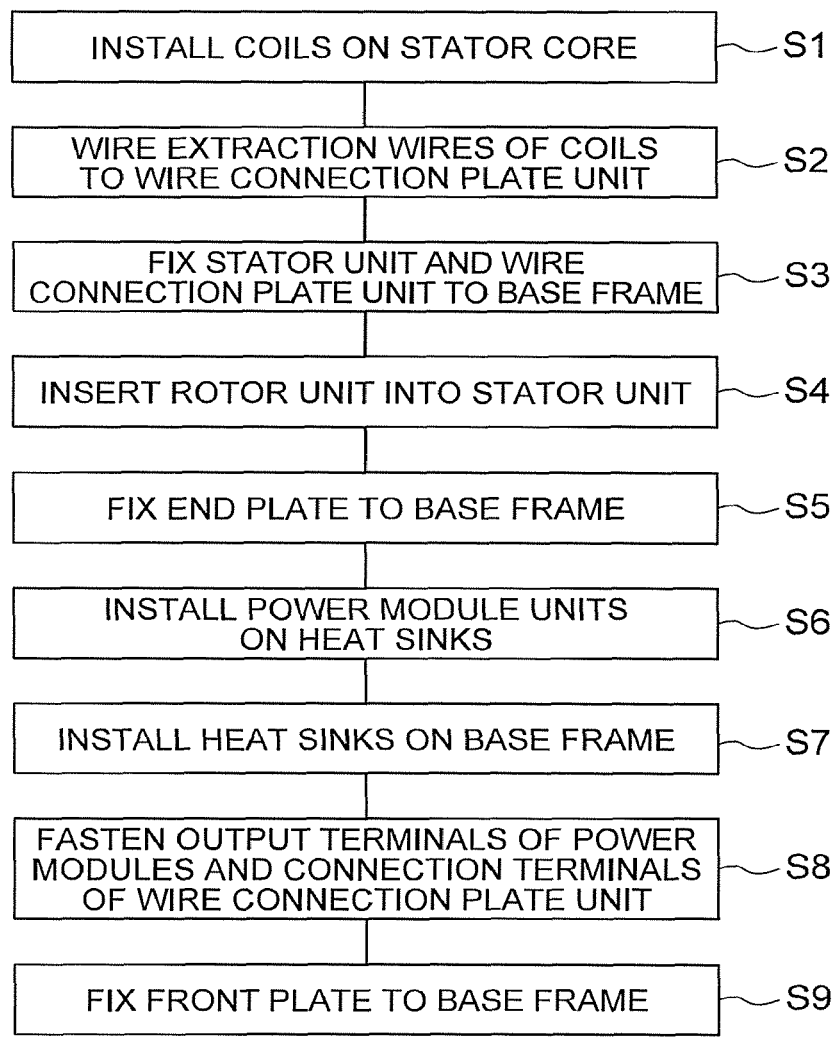
FIG. 6 is a flowchart showing an assembly method of the inverter integrated motor apparatus in FIG. 1.

Next, the method of assembling the inverter integrated motor apparatus according to the first embodiment will be described with reference to the flowchart in FIG. 6. In the method in FIG. 6, firstly, the coils 53 are installed on the stator core 51 (step S1). Thereupon, the wire connection plate unit 140 is installed on the stator unit 50, and extraction wires 54 from the coils 53 of the respective phases are connected by the wire connection plate unit 140 (step S2).

Thereupon, the stator unit 50 and wire connection plate unit 140 are fixed by pressure-fitting or shrink-fitting into the motor unit accommodating section 17 of the base frame 10 (step S3). Thereupon, the rotor unit 60 is inserted into the stator unit 50 (step S4). In this case, the output shaft 63 is inserted into the opposite load-side bearing.

Next, the end plate 2 is fixed to the base frame 10 and the cover is placed on the load-side of the base frame 10 (step S5). In this case, the output shaft 63 is inserted into the load-side bearing. In this way, the installation of the motor unit 130 and the wire connection plate unit 140 on the base frame 10 is completed.

Subsequently, the module units 121 are then assembled by installing the control substrates 31 on the power modules 30, and also wiring control wires (not illustrated) which are connected to the power modules 30. The module units 121 are installed on the heat sinks 11 on the outside of the base frame 10 (step S6). In this case, the heat-radiating surfaces of the power modules 30 make tight contact with the heat sinks 11.

Next, the heat sinks 11 on which the module units 121 have been installed, in other words, the heat sink assemblies, are installed on the outer wall surface of the inverter unit accommodating section 16 of the base frame 10 (step S7).

Thereupon, the output terminals of the power modules 30 and the connection terminals 55 of the six phases of the wire connection plate unit 140 are connected (step S8). The electrical connections between the electrical components of the inverter unit 120 are then made. Finally, the front plate 3 is fixed to the opposite load-side end portion of the base frame 10 (step S9). Thereby, the whole of the assembly task is completed.

In the inverter integrated motor apparatus described above, in the inverter unit accommodating section 16 openings 14 are provided at intervals in the circumferential direction, the rib section 29 is formed between the mutually adjacent openings 14, the heat sinks 11 are installed on the base frame 10 so as to cover the openings 14, and the power modules 30 and control substrates 31 are disposed on the inside of the heat sinks 11, and therefore it is possible to simultaneously achieve both improvement in the assembly properties of the inverter unit 120 and improvement in the cooling performance of the inverter unit 120.

More specifically, the frame unit 110 is divided into a base frame 10 in which the openings 14 are provided and heat sinks 11, and therefore the power modules 30 and control substrates 31 can be installed on the heat sinks 11 on the outside of the base frame 10. Conventionally, it has been necessary to install the module units 121 from the inner side in the radial direction of the base frame 10, but in the first embodiment, a structure is achieved in which, even if the heat sinks 11 are installed from the outer side in the radial direction of the base frame 10, the module units 121 are still disposed on the inner wall surface of the frame as in the prior art, and therefore the installation properties of the module unit 121 are improved.

Furthermore, since the inverter unit accommodating section 16 is configured by bone-shaped rib sections 29, then it is possible to make the thermal resistance of the inverter unit accommodating section 16 larger than the motor unit accommodating section 17. Consequently, the heat generated during driving of the motor is not readily transmitted to the inverter unit 120, and the cooling performance of the inverter unit 120 is improved.

In the cross-section perpendicular to the axial direction of the base frame 10, the total cross-sectional area of the rib sections 29 is smaller than the cross-sectional area of the motor unit accommodating section 17, and therefore it is possible to make the thermal resistance of the inverter unit accommodating section 16 reliably larger than the motor unit accommodating section 17. Moreover, by providing spacers between the base frame 10 and the heat sinks 11, so that they do not make tight contact, or by fixing same via a material having relatively low thermal conductivity, such as plastic or epoxy resin, then the cooling performance of the inverter unit 120 is improved.

Furthermore, since the area of the power module 30 and the control substrate 31 when an opening 14 is viewed from the center of the inverter unit accommodating section 16 is smaller than the area of the opening 14, then the control substrate 31 is also installed on the heat sink 11 to the outside of the base frame 10, and can be installed from the outside of the base frame 10, and the assembly properties can be further improved. Moreover, the heat sinks 11 and the base frame 10 can be divided without increasing the size thereof.

Furthermore, since the control substrates 31 can be arranged as near as possible to the power modules 30, then there is no delay in the switching operation of the power modules 30 due to the floating capacitance of the signal lines which are connected to the power modules 30 from the control substrates 31.

Moreover, by providing an opening 14 in the inverter unit accommodating section 16, it is possible to separate the output terminals of the power modules 30 from the base frame 10, and the eddy current loss generated by the base frame 10 can be reduced.

Furthermore, there is no need to embed the module units 121 in the heat sinks 11, and hence the heat sinks 11 can be formed relatively thin, and the effective volume inside the frame unit 110 can be increased.

Moreover, since the inverter unit 120 is disposed in the axial direction of the motor unit 130, then the extraction wire 54 from the motor unit 130 to the inverter unit 120 can be wired easily.

Moreover, since the base frame 10 is formed by forming the inverter unit accommodating section 16 and the motor unit accommodating section as an integrated body, then there is no need for a member to couple the inverter unit accommodating section 16 and the motor unit accommodating section, and therefore the size can be reduced further.

Furthermore, since the base frame 10 is formed by forming the inverter unit accommodating section 16 and the motor unit accommodating section as an integrated body, then the overall rigidity of the drive apparatus is increased.

The number of heat sinks 11 is not limited to the number six illustrated in FIG. 1, and may be any number equal to or greater than two. The number of openings 14 is equal to the number of heat sinks 11.

Second Embodiment

Figure 7:
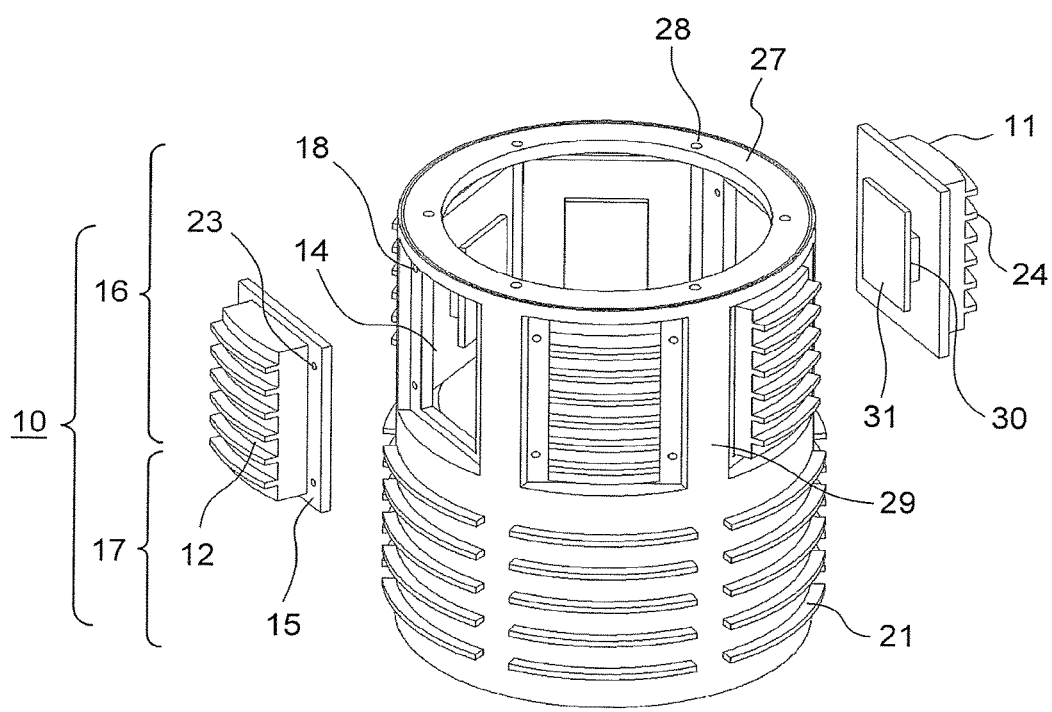
FIG. 7 is a perspective drawing showing a principal part of an inverter integrated motor apparatus according to a second embodiment of this invention.

Next, FIG. 7 is a perspective drawing showing a principal part of an inverter integrated motor apparatus according to a second embodiment of this invention. In the second embodiment, a flange section 15 is provided on the peripheral edge section of each heat sink 11, and the flange section 15 is screw-fastened to the inner wall surface of the inverter unit accommodating section 16. During assembly, the module units 121 are installed on the heat sinks 11 outside the base frame 10, the heat sinks 11 are introduced from the opposite load-side of the base frame 10, and the flange sections 15 are fixed on the inner wall surface of the base frame 10 at the periphery of the openings 14. The remainder of the configuration and the assembly method is similar or identical to the first embodiment.

In this way, the heat sinks 11 may be fixed to the inner wall surface of the base frame 10 and similar beneficial effects to the first embodiment can be obtained.

Third Embodiment

Figure 8:
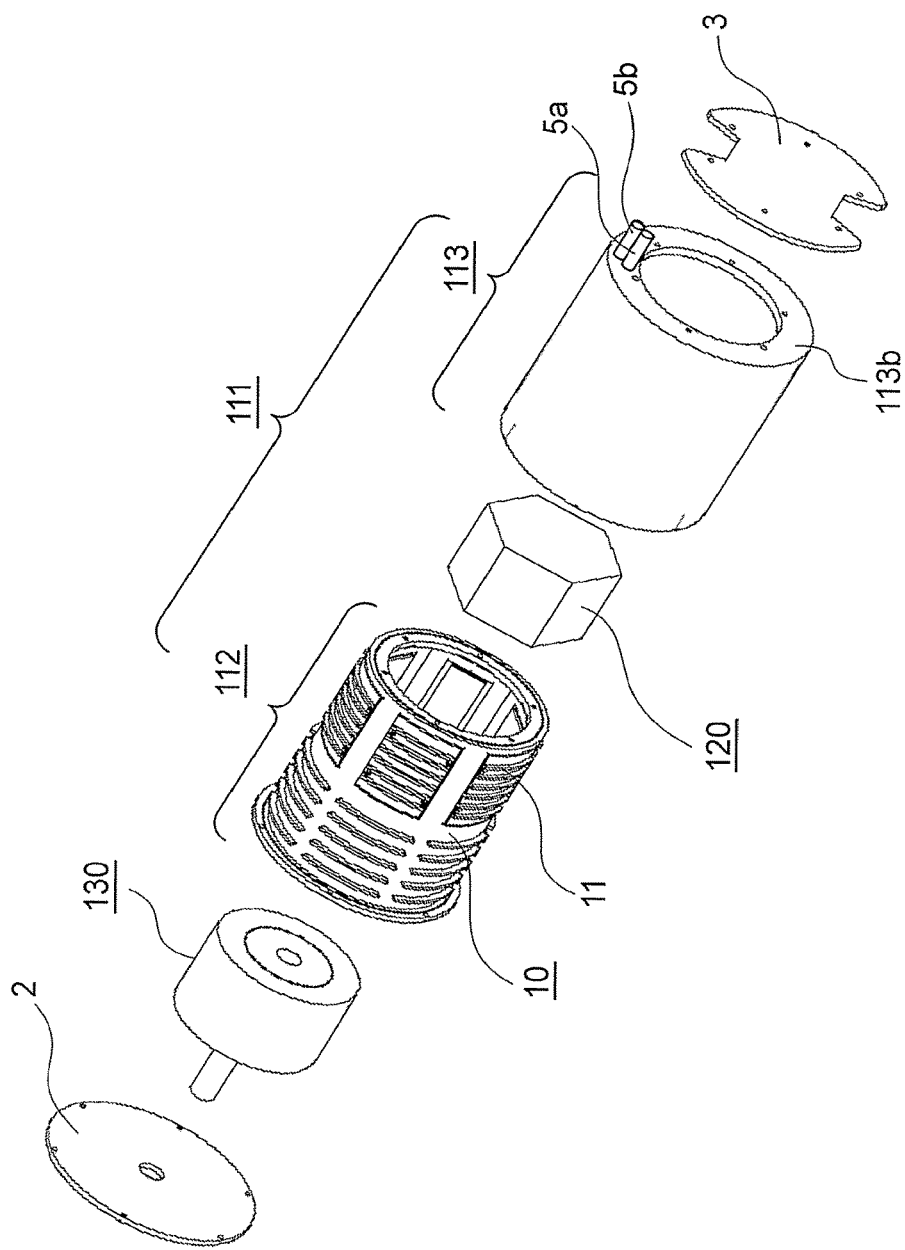
FIG. 8 is an exploded perspective drawing showing an inverter integrated motor apparatus according to a third embodiment of this invention.
Figure 9:
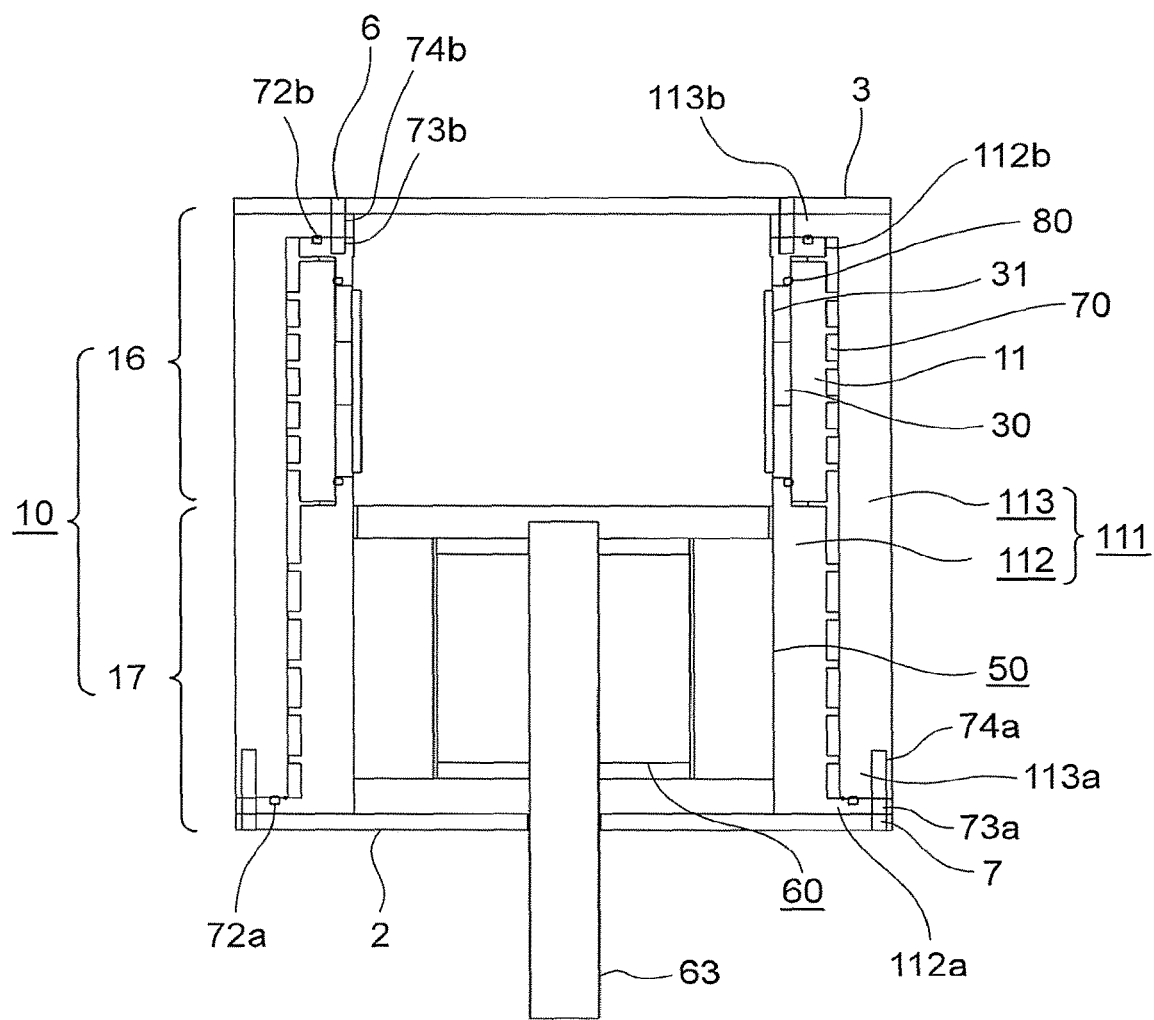
FIG. 9 is an approximate cross-sectional diagram of the inverter integrated motor apparatus in FIG. 8.

Next, FIG. 8 is an exploded perspective drawing showing an inverter integrated motor apparatus according to a third embodiment of this invention and FIG. 9 is an approximate cross-sectional diagram of the inverter integrated motor apparatus of FIG. 8; in FIG. 9, the configuration inside the inverter unit accommodating section 16, and the like, are omitted. In the third embodiment, an inner frame 112 is configured by a base frame 10 and six heat sinks 11. A cylindrical outer frame 113 is fitted onto the outer side in the radial direction of the inner frame 112. Thereby, a cooling liquid flow channel 70 is formed between the inner frame 112 and the outer frame 113. A liquid-cooled frame 111 is configured by the inner frame 112 and the outer frame 113.

An inlet-side nipple 5a for supplying a cooling liquid and an outlet-side nipple 5b for discharging the cooling liquid are attached to the opposite load-side end portion 113b of the outer frame 113. The cooling liquid supplied from the inlet-side nipple 5a is circulated in the circumferential direction inside the cooling liquid flow channel 70, and is discharged from the outlet-side nipple 5b.

A sealed structure (liquid-tight structure) is provided respectively between the load-side end portion 112a of the inner frame 112 and the load-side end portion 113a of the outer frame 113, and between the opposite load-side end portion 112b of the inner frame 112 and the opposite load-side end portion 113b of the outer frame 113.

More specifically, the load-side end portion 112a of the inner frame 112 is a structure which extends to the outer side in the radial direction. Furthermore, a circular ring-shaped groove is provided in the load-side end portion 112a of the inner frame 112, and a circular ring-shaped seal member 72a is fitted into this groove. The load-side end surface of the outer frame 113 abuts against the seal member 72a.

A plurality of screw insertion holes 73a are provided in the load-side end portion 112a of the inner frame 112. The screw insertion holes 73a are disposed on the outer side in the radial direction of the seal member 72a. A plurality of screw holes 74a corresponding to the screw insertion holes 73a are provided on the load-side end portion 113a of the outer frame 113.

A circular ring-shaped groove is provided in the opposite load-side end portion 112b of the inner frame 112, and a circular ring-shaped seal member 72b is fitted into this groove. The opposite load-side end portion 113b of the outer frame 113 is extended inward in the radial direction so as to cover the seal member 72b, and abuts against the seal member 72b.

A plurality of screw holes 73b are provided in the opposite load-side end portion 112b of the inner frame 112. The screw holes 73b are disposed on further toward the inner side in the radial direction than the seal member 72b. A plurality of screw insertion holes 74b corresponding to the screw holes 73b are provided on the opposite load-side end portion 113b of the outer frame 113.

The surface of the load-side end portion 113a of the outer frame 113 which contacts the seal member 72a is formed to be flat so that pressure is applied evenly to the seal member 72a. The surface of the opposite load-side end portion 113b of the outer frame 113 which contacts the seal member 72b is formed to be flat so that pressure is applied evenly to the seal member 72b.

It is also possible to interchange the load-side seal structure and the opposite load-side seal structure between the inner frame 112 and the outer frame 113.

The screw insertion holes 7 in the end plate 2 are arranged so as to correspond to the screw insertion holes 73a. The end plate 2 is screw-fastened to the outer frame 113, as well as the inner frame 112.

The screw insertion holes 6 in the front plate 3 are arranged so as to correspond to the screw insertion holes 74b. The front plate 3 is screw-fastened to the inner frame 112, as well as the outer frame 113.

A substantially quadrilateral groove is provided in the periphery of each opening 14 of the base frame 10, and a seal member 80 is fitted into this groove. The seal members 80 are interposed between each heat sink 11 and the base frame 10. The power module installation surface 13 of the heat sink 11 is flat, and is formed so as to cover the seal members 80.

Screw holes 18 (FIG. 2) for fixing the heat sinks 11 to the base frame 10 are disposed to the outside of the seal members 80. Furthermore, the screw holes 18 are formed so as not to penetrate through the base frame 10. The remainder of the configuration and the assembly method is similar or identical to the first embodiment.

In an inverter integrated motor apparatus of this kind, since the outer frame 113 is fitted to the outer side in the radial direction of the inner frame 112, and the seal members 80 are interposed between each heat sink 11 and the base frame 10, then it is possible to form the cooling liquid flow channel 70 between the inner frame 112 and the outer frame 113, while preventing the leaking of liquid into the base frame 10. Moreover, since the base frame 10 and the heat sinks 11 make contact via the seal members 80, then the heat transmitted to the base frame 10 from the motor unit 130 is prevented from being transmitted to the power modules 30 which are installed on the heat sinks 11, and therefore the cooling performance of the inverter unit 120 is improved.

It is possible to improve the cooling performance of the motor unit 130 and the inverter unit 120, by introducing a fluid having high thermal conductivity (for example, water) into the cooling liquid flow channel 70, using a pump, or the like. Consequently, it is possible to increase the maximum output density and the torque density of the inverter unit 120.

Furthermore, since a sealed structure is provided respectively between the load-side end portion 112a of the inner frame 112 and the load-side end portion 113a of the outer frame 113, and between the opposite load-side end portion 112b of the inner frame 112 and the opposite load-side end portion 113b of the outer frame 113, it is possible to prevent leaking of liquid.

Moreover, since the screw holes 18 are formed so as not to pass through the base frame 10, then there is no occurrence of liquid leaking from the cooling liquid flow channel 70 to the inside of the base frame 10, via the screw holes 18.

Moreover, since the inverter unit 120 is disposed in the axial direction of the motor unit 130, then the extraction wire 54 from the motor unit 130 to the inverter unit 120 can be wired easily.

Moreover, since the motor unit 130 and the inverter unit 120 can be cooled by the same flow channel 70, then there is no need to configure and arrange a plurality of cooling flow channels, and hence the flow channel layout is very simple and there is reduced pressure loss in the flow channels.

Moreover, since the base frame 10 is formed by forming the inverter unit accommodating section 16 and the motor unit accommodating section as an integrated body, then there is no need for a member to couple the inverter unit accommodating section 16 and the motor unit accommodating section, and therefore the size can be reduced further.

Furthermore, since the base frame 10 is formed by forming the inverter unit accommodating section 16 and the motor unit accommodating section as an integrated body, then there is no need for a member to seal the inverter unit accommodating section 16 and the motor unit accommodating section, and therefore the number of components can be reduced and liquid-tight properties can be improved.

Furthermore, since the base frame 10 is formed by forming the inverter unit accommodating section 16 and the motor unit accommodating section as an integrated body, then the overall rigidity of the drive apparatus is increased.

Fourth Embodiment

Figure 10:
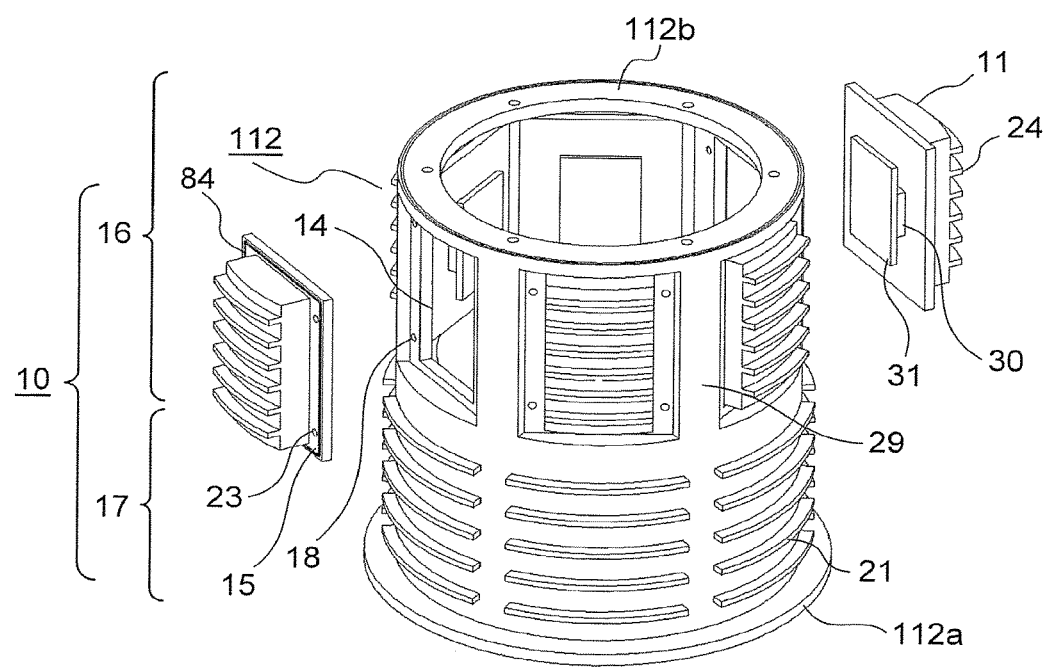
FIG. 10 is a perspective drawing showing a principal part of an inverter integrated motor apparatus according to a fourth embodiment of this invention.

Next, FIG. 10 is a perspective drawing showing a principal part of an inverter integrated motor apparatus according to a fourth embodiment of this invention. The fourth embodiment combines the third embodiment and the second embodiment. In other words, a groove is formed in the flange section 15 of each heat sink 11, and a seal member 84 is fitted into the groove.

The flange section 15 is screw-fastened to the inner wall surface of the inverter unit accommodating section 16. The seal member 84 is interposed between the flange section 15 and the inner wall surface of the base frame 10. Furthermore, the seal member 84 is disposed on the outside of the screw insertion holes 23. The remainder of the configuration and the assembly method is similar or identical to the third embodiment.

In this way, liquid-tight properties can be maintained on the inner wall surface of the base frame 10, and similar beneficial effects to the third embodiment are obtained.

Fifth Embodiment

Figure 11:
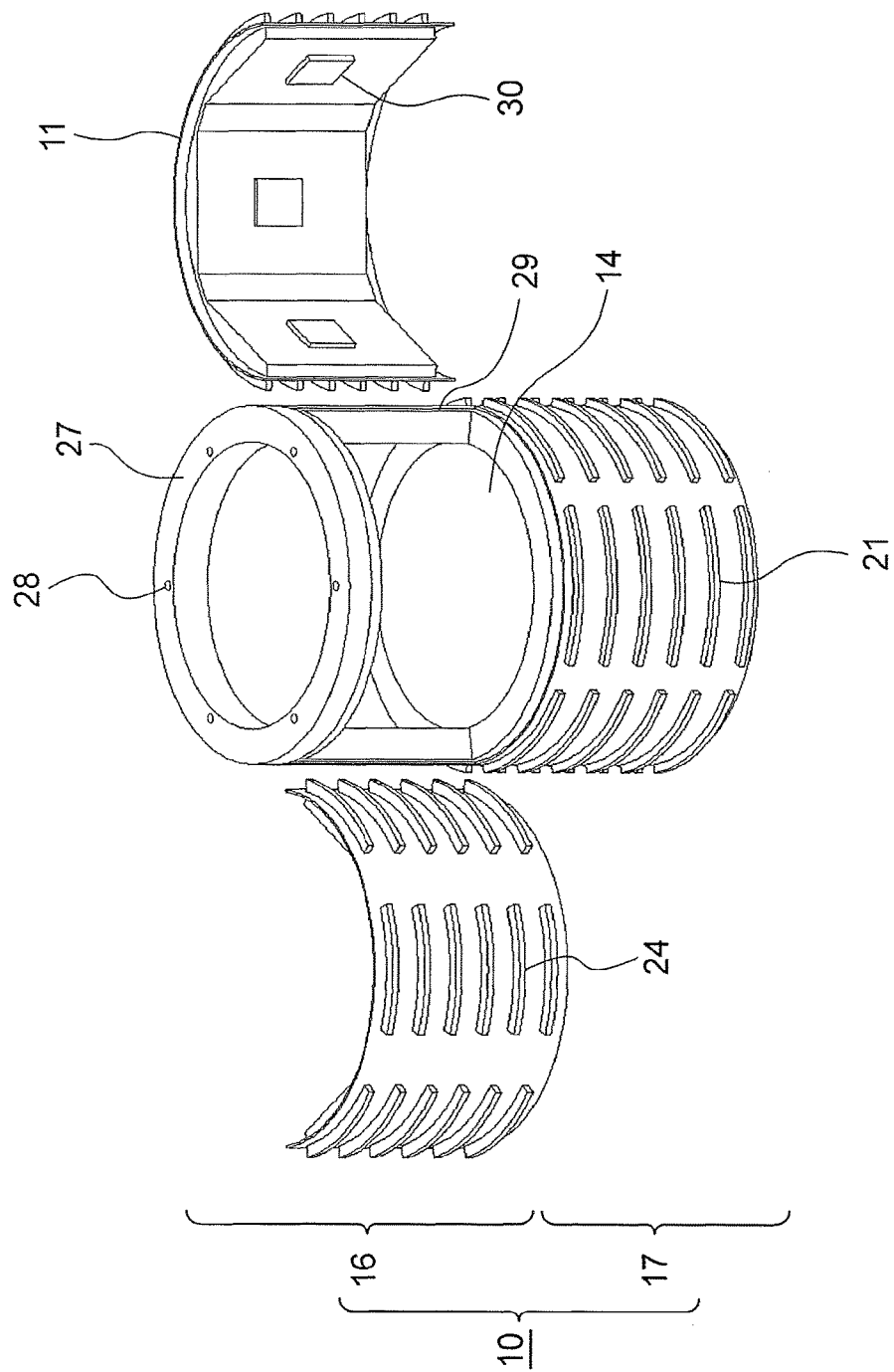
FIG. 11 is a perspective drawing showing a principal part of an inverter integrated motor apparatus according to a fifth embodiment of this invention.

Next, FIG. 11 is a perspective drawing showing a principal part of an inverter integrated motor apparatus according to a fifth embodiment of this invention. In the fifth embodiment, there are two openings 14 in the motor unit accommodating section 17 of the base frame 10, and two heat sinks 11 are installed so as to cover the openings 14. Three single-phase (single-leg) power modules 30 are installed at even intervals in the circumferential direction, on the heat sinks 11.

Control substrates (not illustrated) for driving the power modules 30 of the three phases are installed on the heat sinks 11. The control substrates are wired to the power modules 30 by signal wires (not illustrated), thereby configuring a three-phase inverter device. The remainder of the configuration and the assembly method is similar or identical to the first, second, third or fourth embodiment.

In this way, by installing two or more power modules 30 on one heat sink 11, it is possible to reduce the number of heat sinks 11, even in an inverter unit 120 with a large number of power modules 30. In other words, even if a multi-set multi-phase motor is used, there is no need to prepare heat sinks 11 in equal number to the power modules 30, and hence the number of components can be reduced and the assembly properties are also improved.

Furthermore, when the inverter unit 120 is an N-phase drive inverter device (where N is an integer equal to or greater than 2), by installing power modules 30 for the N phases on each of the heat sinks 11, it is possible to connect the power modules 30 of each group with the DC wires of the control substrate and the control signal lines, outside the base frame 10, when using a motor unit 130 having a multi-group coil structure, and therefore the assembly properties are further improved. Moreover, it is possible to use one control substrate for the power modules 30 of each group. Moreover, by providing a sealed structure similarly to the third and fourth embodiments, liquid cooling is also possible.

Furthermore, since the base frame 10 is formed by forming the inverter unit accommodating section 16 and the motor unit accommodating section as an integrated body, then there is no need for a member to seal the inverter unit accommodating section 16 and the motor unit accommodating section, and therefore the number of components can be reduced and liquid-tight properties can be improved.

Sixth Embodiment

Figure 12:
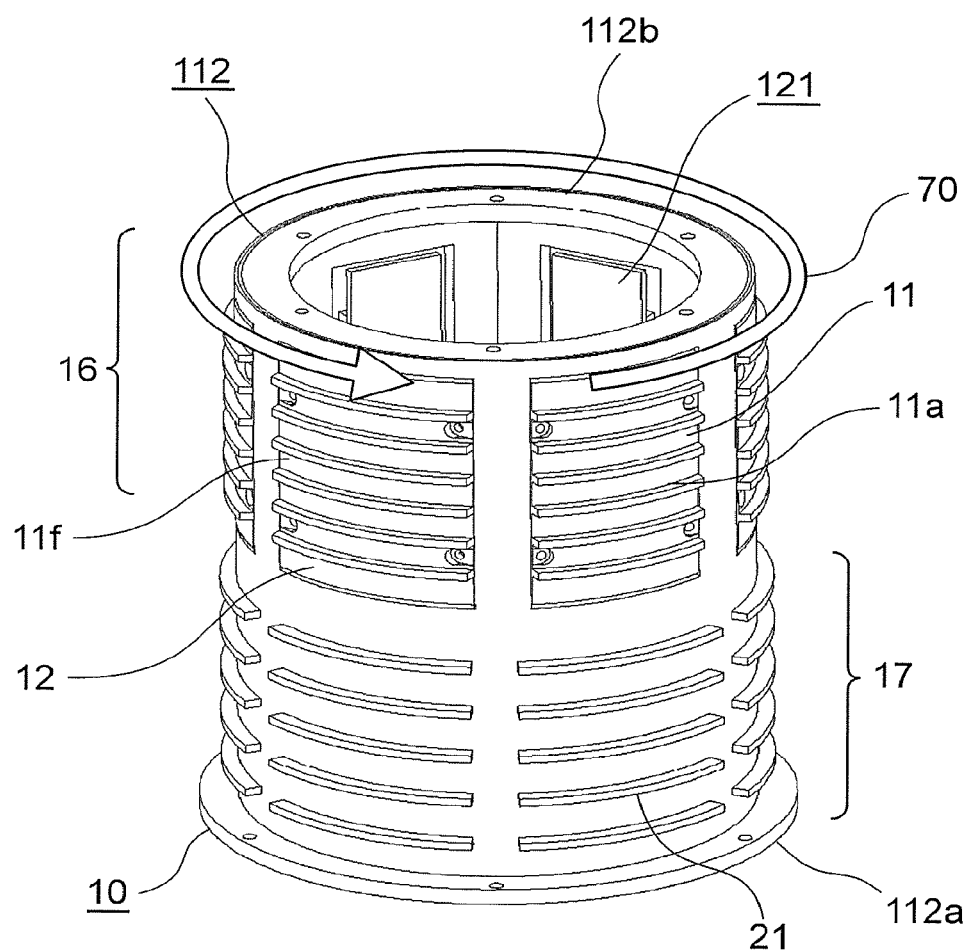
FIG. 12 is a perspective drawing showing a principal part of an inverter integrated motor apparatus according to a sixth embodiment of this invention.

Next, FIG. 12 is a perspective drawing showing a principal part of an inverter integrated motor apparatus according to a sixth embodiment of this invention and the arrow in the drawing illustrates the direction of flow of the cooling liquid. In the sixth embodiment, the area of the heat-radiating surface 12 in the terminal end heat sink 11f is formed to be larger than the area of the heat-radiating surface 12 in the start end heat sink 11a of the cooling liquid flow channel 70.

More specifically, the area of the heat-radiating surface 12 becomes gradually larger in the circumferential direction, from the start end towards the terminal end. In other words, the width in the circumferential direction of the heat sink 11 on the terminal end side is greater than the width in the circumferential direction of the heat sink 11 on the start end side of the cooling liquid flow channel 70. Consequently, in the cooling liquid flow channel 70 (FIG. 9), the area of the heat sink 11 on the terminal end side which contacts the cooling liquid is greater than the area of the heat sink 11 on the start end side which contacts the cooling liquid. The remainder of the configuration and the assembly method is similar or identical to the third or fourth embodiment.

In an inverter integrated motor apparatus of this kind, even if the temperature of the cooling liquid at the terminal end of the cooling liquid flow channel 70 is higher than at the start end, the cooling performance of the heat sink 11 in the terminal end portion of the cooling liquid flow channel 70 does not fall, and the cooling performance of the power modules 30 arranged in the circumferential direction can be kept uniform.

Seventh Embodiment

Figure 13:
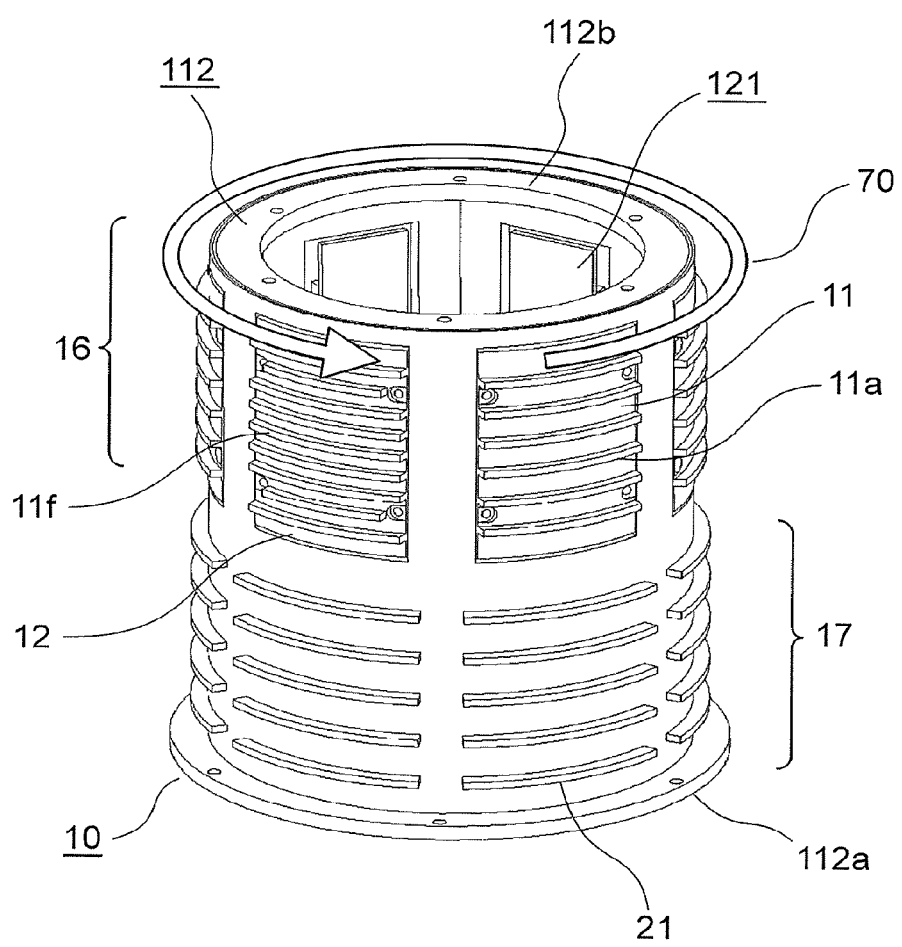
FIG. 13 is a perspective drawing showing a principal part of an inverter integrated motor apparatus according to a seventh embodiment of this invention.

Next, FIG. 13 is a perspective drawing showing a principal part of an inverter integrated motor apparatus according to a seventh embodiment of this invention and the arrow in the drawing illustrates the direction of flow of the cooling liquid. In the seventh embodiment, the number of heat-radiating fins 24 in the terminal end heat sink 11*f* of the cooling liquid flow channel 70 is greater than the number of heat-radiating fins 24 in the start end heat sink 11*a*.

More specifically, the number of heat-radiating fins 24 in the start end heat sink 11*a* of the cooling liquid flow channel 70 is six, and the number of heat-radiating fins 24 in the terminal end heat sink 11*f* of the cooling liquid flow channel 70 is nine. Consequently, in the cooling liquid flow channel 70 (FIG. 9), the area of the heat sink 11 on the terminal end side which contacts the cooling liquid is greater than the area of the heat sink 11 on the start end side which contacts the cooling liquid. The remainder of the configuration and the assembly method is similar or identical to the third or fourth embodiment.

Even with a configuration of this kind, it is possible to ensure even cooling performance in the power modules 30 which are arranged in the circumferential direction.

REFERENCE SIGNS LIST

10 Base frame
11 Heat sink
14 Opening
16 Inverter unit accommodating section
17 Motor unit accommodating section
29 Rib section
30 Power module
31 Control substrate
70 Cooling liquid flow channel
80, 84 Seal member
112 Inner frame
113 Outer frame
120 Inverter unit
130 Motor unit

The invention claimed is:

1. An inverter integrated motor apparatus, comprising:
a cylindrical base frame which has a motor accommodating section and an inverter accommodating section;
a motor which is accommodated in the motor accommodating section;
an inverter which has a control substrate and a power module provided on the control substrate, the inverter being accommodated in the inverter accommodating section; and
a plurality of heat sinks which cool the power module,
wherein, in the inverter accommodating section, a plurality of openings are provided at intervals in a circumferential direction;
a rib section is formed between mutually adjacent openings;
the plurality of heat sinks are installed on the base frame to cover the openings and to communicate with outside the cylindrical base frame; and
the power module and the control substrate are disposed on a backside of a heat sink of the plurality of heat sinks,
wherein, the plurality of openings include a first opening and a second opening, which is adjacent to the first opening, a first rib section is formed between the first opening and the second opening and is located at a first side of the second opening in the circumferential direction, a second rib is formed at a second side of the second opening in the circumferential direction, and a heat sink is attached to the first rib section and the second rib section to cover the second opening.

2. The inverter integrated motor apparatus according to claim 1, wherein, in a cross-section perpendicular to the axial direction of the base frame, a total cross-sectional area of the rib section is smaller than a cross-sectional area of the motor accommodating section.

3. The inverter integrated motor apparatus according to claim 1, wherein heat sink assemblies, in which of which the power module and the control substrate are installed on each heat sink, are fitted into the openings.

4. The inverter integrated motor apparatus according to claim 3, wherein an area of the power module and the control substrate, when the opening is viewed from the center of the inverter accommodating section, is smaller than an area of the opening.

5. The inverter integrated motor apparatus according to claim 1, further comprising a cylindrical outer frame which is fitted onto an outer side in a radial direction of the inner frame configured by the base frame and the heat sinks, wherein a seal member is interposed between the heat sinks and the base frame.

6. The inverter integrated motor apparatus according to claim 1, wherein two or more of the power modules are installed on at least one of the heat sinks.

7. The inverter integrated motor apparatus according to claim 1, wherein when N is an integer equal to or greater than two and the inverter is an N-phase drive inverter device, the power modules for N phases are installed in the heat sinks.

8. The inverter integrated motor apparatus according to claim 1, Wherein
a cooling liquid flow channel in which a cooling liquid for cooling the heat sinks can flow is formed on an outer side in a radial direction of the inverter accommodating section; and
an area of the first heat sink on a terminal end Side of the cooling liquid flow channel which contacts the cooling liquid is larger than an area of the second heat sink on a start end side of the cooling liquid flow channel which contacts the cooling liquid.

9. The inverter integrated motor apparatus according to claim 8, wherein a width in a circumferential direction of the first heat sink on the terminal end side of the cooling liquid flow channel is larger than a width in a circumferential direction of the second heat sink on the start end side.

10. The inverter integrated motor apparatus according to the claim 8, wherein the heat sinks each have, on an outer side in a radial direction, heat-radiating fins; and a number of the heat-radiating fins on the first heat sink on the terminal end side of the cooling liquid flow channel is greater than a number of the heat-radiating fins on the second heat sink on the start end side.

11. The inverter integrated motor apparatus according to claim 1, wherein, each heat sink is detached from remaining ones of the plurality of heat sinks.

12. The inverter integrated motor apparatus according to claim 1, wherein the plurality of heat sinks are installed on the base frame to communicate with outside the cylindrical base.

* * * * *